(12) United States Patent
Jinnouchi

(10) Patent No.: US 8,459,419 B2
(45) Date of Patent: Jun. 11, 2013

(54) FLUID PRESSURE SHOCK ABSORBER

(75) Inventor: Takahiko Jinnouchi, Minokamo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 256 days.

(21) Appl. No.: 12/926,092

(22) Filed: Oct. 26, 2010

(65) Prior Publication Data

US 2011/0095462 A1    Apr. 28, 2011

(30) Foreign Application Priority Data

Oct. 27, 2009    (JP) .................................. 2009-246705

(51) Int. Cl.
 *F16F 9/32*    (2006.01)
(52) U.S. Cl.
 USPC ........................ 188/322.19; 188/313; 188/315
(58) Field of Classification Search
 USPC ................. 188/297, 313, 314, 315, 316, 318,
  188/322.19; 267/64.1, 64.15, 64.26; 92/169.1,
  92/171.1
 See application file for complete search history.

(56) References Cited

U.S. PATENT DOCUMENTS

| | | | | |
|---|---|---|---|---|
| 3,279,781 | A | * | 10/1966 | Rumsey ...................... 267/64.15 |
| 3,661,230 | A | * | 5/1972 | Burnett ......................... 188/71.9 |
| 3,666,256 | A | * | 5/1972 | Ellis et al. ...................... 188/315 |
| 3,782,710 | A | * | 1/1974 | Selke et al. ................. 267/64.11 |
| 4,057,264 | A | * | 11/1977 | Suzuki et al. ................. 188/314 |
| 6,345,707 | B1 | * | 2/2002 | Klembczyk ................... 188/315 |
| 2005/0145456 | A1 | * | 7/2005 | Tomonaga et al. ........... 188/297 |
| 2008/0053764 | A1 | * | 3/2008 | Tomonaga et al. ........... 188/315 |

FOREIGN PATENT DOCUMENTS

JP    2008-069830    3/2008

* cited by examiner

*Primary Examiner* — Thomas J Williams
(74) *Attorney, Agent, or Firm* — Rabin & Berdo, P.C.

(57) ABSTRACT

A fluid pressure shock absorber comprises a cylinder 3 disposed in a tube 2 and having a base supported by the tube 2 and a head member 31 fitted onto a tip of the cylinder 3. A hole 2*b* is formed in the tube 2 facing the head member 31. A ring-shaped stopper member 101 is screwed onto an outer circumference of the head member 31. A pin member 102 held by the head member 31 and biased in a radial direction by a snap ring 103 penetrates the hole 2*b*, thereby making connection of the tube 2 and the cylinder 3 easy.

10 Claims, 2 Drawing Sheets

FLUID PRESSURE SHOCK ABSORBER

FIELD OF THE INVENTION

This invention relates to a supporting structure of a tip of a cylinder disposed in a tube of a fluid pressure shock absorber.

BACKGROUND OF THE INVENTION

A front fork for supporting a front wheel of a motor-cycle comprises, for example, a fluid pressure shock absorber comprising an outer tube, an inner tube fitted into the outer tube, a cylinder disposed in the inner tube, and a piston accommodated in the cylinder and supported by the outer tube via a piston rod to be free to slide in the cylinder.

JP2008-69830A, issued by the Japan Patent Office in 2008, proposes a fluid pressure shock absorber in which a head member that supports the piston rod to be free to slide is screwed onto a tip of the cylinder. An outer circumference of the head member is caused to contact an inner circumference of the inner tube, and as a result, the head member functions to maintain concentricity between the cylinder and the inner tube.

SUMMARY OF THE INVENTION

To screw the head member onto the tip of the cylinder, it is necessary to increase a thickness of the tip of the cylinder in which a screw part is formed. Forming a screw part in the tip of the cylinder makes a manufacturing process of the cylinder complicated. Further, screwing the head member onto the cylinder takes time.

It is therefore an object of this invention to improve a supporting structure of a head member that is interposed between a tip of a cylinder and an inner tube.

To achieve the above object, a fluid pressure shock absorber according to this invention comprises a tube, a cylinder disposed in the tube and having a tip and a base supported by the tube, a head member supported on a tip of the cylinder, a hole formed in the tube and having an opening facing the head member, a ring-shaped stopper member screwed onto an outer circumference of the head member, and a pin member passing through the stopper member radially. The pin member comprises a base that is supported by the head member radially outward and a tip that penetrates the hole.

The details as well as other features and advantages of this invention are set forth in the remainder of the specification and are shown in the accompanying drawings.

DESCRIPTION OF THE PREFERRED EMBODIMENTS

Figure 1:
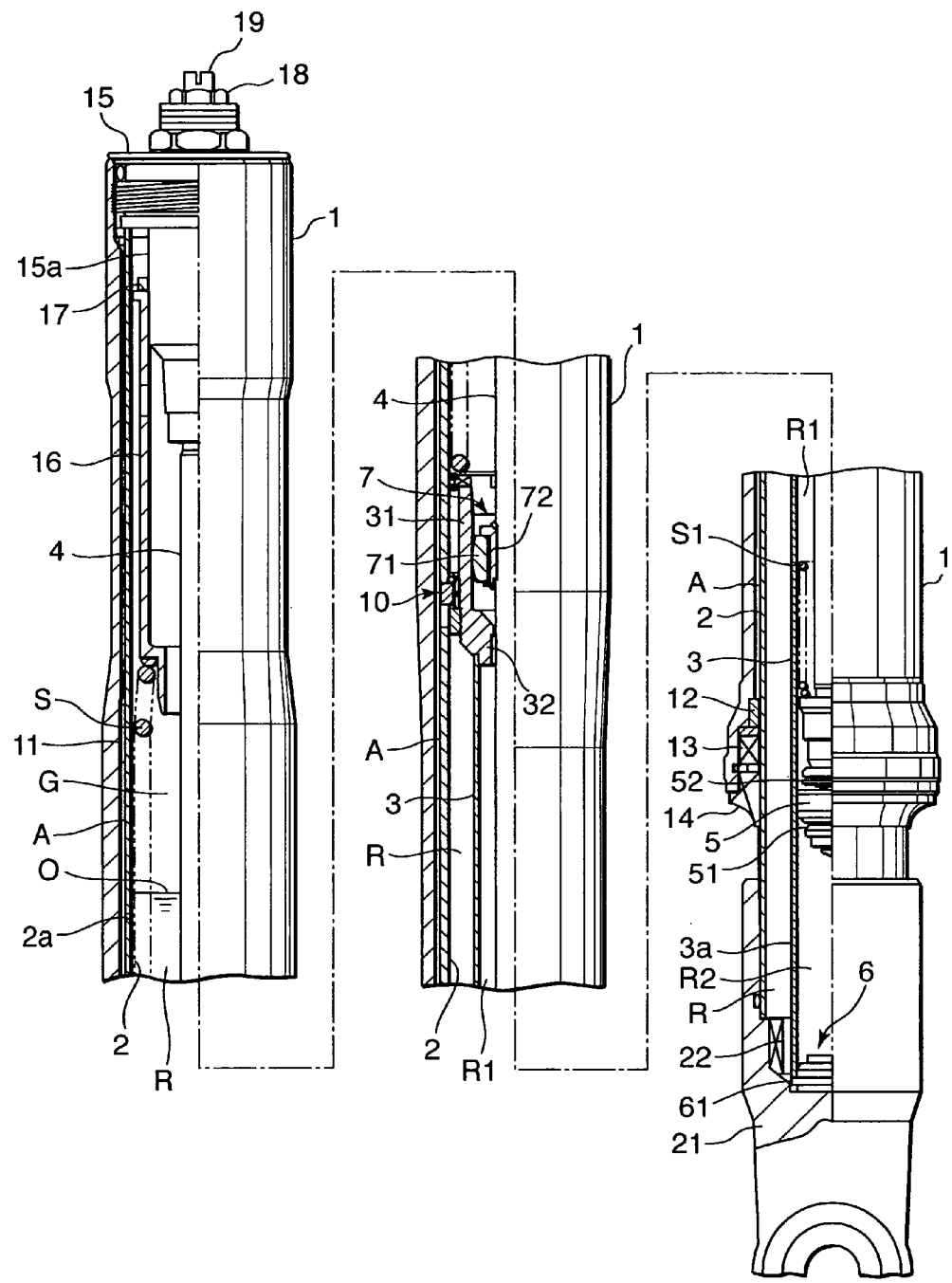
FIG. 1 is a longitudinal sectional view including a partial side view of a hydraulic shock absorber according to an embodiment of this invention.

Referring to FIG. 1 of the drawings, a hydraulic shock absorber disposed on both sides of a front wheel of a motor-cycle to form a front fork comprises an outer tube 1 and an inner tube 2.

A base of the outer tube 1, which corresponds to an upper end of the same in the figure, is fixed to a vehicle body via an upper bracket and a base of the inner tube 2, which corresponds to a lower end of the same in the figure, supports the front wheel.

A tip of the inner tube 2 is inserted into the outer tube 1 to be free to slide along a center axis of the shock absorber. A base of the inner tube 2 is attached to a wheel shaft of the front wheel via a bottom member 21. The bottom member 21 is formed into a cylindrical shape having a bottom. An outer circumference of the base of the inner tube 2 is screwed into an inner circumference of the bottom member 21.

Bearings 11 and 12 that supports the inner tube 2 to be free to slide in an axial direction along a center axis are fixed to the inner circumference of the outer tube 1.

A lubricating gap A is formed between the outer tube 1 and the inner tube 2 between the bearings 11 and 12. The lubricating gap A is supplied with working oil that is led from an interior of the inner tube 2 via a communicating hole 2a formed in the inner tube 2 so as to ensure smooth sliding of the outer tube 1 with respect to the inner tube 2.

The base of the outer tube 1 is closed by a cap member 15. An oil seal 13 and a dust seal 14 are arranged on the inner circumference of an opening of a tip of the outer tube 1 in series with the bearing 12. The oil seal 13 has a function to close the shock absorber tightly. The dust seal 14 has a function to scrape away dust that is adhered to an outer circumference of the inner tube 2, thereby preventing the dust from contacting the oil seal 13 and preserving a sealing performance of the oil seal 13.

The hydraulic shock absorber accommodates a damper comprising a cylinder 3, a piston 5, and a piston rod 4 in the inner tube 2.

The cylinder 3 is disposed in the inner tube 2 coaxially therewith. A base of the piston rod 4 is fixed to the outer tube 1. A piston 5 fixed to a tip of the piston rod 4 is inserted into the cylinder 3. The piston 5 slides in the cylinder 3 in an axial direction in response to elongation and contraction of the shock absorber. Herein, elongation and contraction of the shock absorber denote elongation and contraction of the outer tube 1 and the inner tube 2.

The cylinder 3 is filled with working oil. The interior of the cylinder 3 is divided by the piston 5 into an oil chamber R1 located on a side of the piston rod 4 and an oil chamber R2 located on the opposite side of the piston 5 to the piston rod 4.

An oil reservoir R is formed between the cylinder 3 and the inner tube 2. A gas chamber G filled with a gas is formed above an oil surface O in the reservoir R. The gas chamber G expands and contracts in response to the elongation and contraction of the hydraulic shock absorber while exerting a resilient force of a compressed gas on the outer tube 1 and the inner tube 2, or in other words acting as a gas spring. An inert gas is used for the gas filled in the gas chamber G. It is also possible to fill the gas chamber G with air.

The cap member 15 may be provided with a gas pressure adjusting mechanism such as an air valve. The communicating hole 2a should be formed in a position to face the working oil below the oil surface O irrespective of the elongation and contraction of the hydraulic shock absorber.

A contraction damping valve 6 is provided in a bottom of the cylinder 3. The contraction damping valve 6 allows surplus working oil in the cylinder 3 to flow from the oil chamber R3 to the oil reservoir R under a predetermined flow resistance as the hydraulic shock absorber contracts. A flange 61 is formed on an outer circumference of the contraction damping valve 6. The flange 61 is gripped by the cylinder 3 and the bottom member 21. The contraction damping valve 6 is provided with a check valve that allows working oil to flow from the oil reservoir R to the oil chamber R2 as the hydraulic shock absorber undergoes elongation while preventing working oil from flowing in the opposite direction.

An elongation damping valve 51 is provided in the piston 5 to allow working oil to flow from the oil chamber R1, which shrinks as the hydraulic shock absorber elongates, to the oil chamber R2 under a predetermined flow resistance. The piston 5 is further provided with a contraction check valve 52 that allows working oil to flow into the oil chamber R2, which enlarges as the hydraulic shock absorber contracts, from the oil chamber R1 without resistance.

A guide member 22 is fixed to the inner circumference of the bottom member 21. A base 3a of the cylinder 3 is fitted into the guide member 22, whereby the guide member 22 functions to ensure a concentricity between the cylinder 3 and the inner tube 2. Instead of providing the guide member 22, it is possible to form plural projections on the inner circumference of the bottom member 21 directed toward a center of the bottom member 21 to hold the base 3a of the cylinder 3.

With the supporting structure described above realizes the cylinder 3 is supported on the bottom member 21 more easily than when the cylinder 3 is fixed to the bottom member 21 using a bolt, for example.

A head member 31 is supported on a tip of the cylinder 3. Specifically, an outer circumference of a base of the head member 31 is fitted into an inner circumference of the tip of the cylinder 3. In comparison with screwing, this fitting structure does not require screw parts to be formed in the head member 31 and the cylinder 3, and therefore makes it easier to fit the head member 31 onto the cylinder 3.

An elongation limiting spring S1 is supported by a piston 5 in parallel with the piston rod 4 in the oil chamber R1. The elongation limiting spring S1 is compressed by contacting the base of the head member 31 when the hydraulic shock absorber elongates to a vicinity of the most elongated state, thereby preventing the piston 5 from colliding with the head member 31.

A suspension spring S is gripped between a tip of the head member 31 and a spring seat 16 fixed to the base of the outer tube 1. The spring seat 16 is supported on an outer circumference of a projecting part 15a of the cap member 15 via a fitting piece 17. The fitting piece 17 is fitted to the outer circumference of the projecting part 15a and displaces in the axial direction in response to a rotating operation of an external adjuster 18 provided outside the cap member 15, thereby moving a supporting position of the suspension spring S axially. By moving the supporting position of the suspension spring S axially, a spring load of the suspension spring S exerted on the outer tube 1 and the cylinder 3 varies.

The cap member 15 comprises an internal adjuster 19 on the inside of the external adjuster 18. A bypass passage is formed in the piston 5 to bypass the elongation damping valve 51. The internal adjuster 19 is provided for operating a needle valve provided in the bypass passage. An elongation damping force of the shock absorber can be adjusted by operating the internal adjuster 19.

The head member 31 is formed into a cylindrical shape and a bushing member 32 is fixed to an inner circumference of the head member 31 so as to support the piston rod 4 to be free to slide.

Figure 2B:
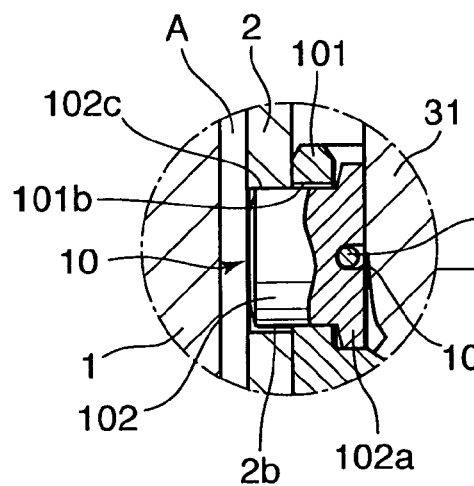
FIGS. 2A and 2B are a longitudinal sectional view of a head member provided in the hydraulic shock absorber and an enlarged longitudinal sectional view of a pin member connecting the head member to an inner tube of the hydraulic shock absorber.
Figure 2A:
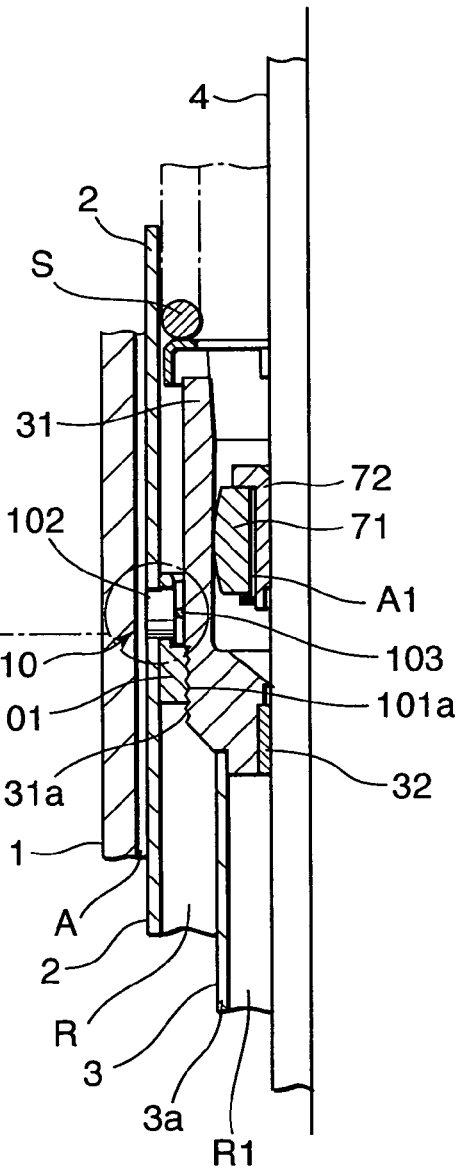

Referring to FIGS. 2A and 2B, an oil lock mechanism 7 comprising an oil lock piece 71 and a holder 72 is provided on the inside of the head member 31. The holder 72 is a member fixed to an outer circumference of the piston rod 4 and provided with a ring groove that opens radially outward. The oil lock piece 71 is a ring-shaped member held in the ring groove at a small gap in an axial direction and a radial direction relative to the ring groove. A gap formed between a bottom of the ring groove and the oil lock piece 71 is named as a gap A1. An outer circumference of the oil lock piece 71 slides on the inner circumference of the head member 31.

The oil lock piece 71 and axial tip portions of the holder 72 that form the ring groove come into contact depending on a position of the oil lock piece 71 in the axial direction. When the piston rod 4 displaces in an elongation direction from the position shown in FIG. 2A, the oil lock piece 71 contacts a tip portion of the holder 72 corresponding to a lower tip of the holder 72 in the figure. This tip portion of the holder 72 has a cut-out, for example, to permanently connect a space formed below the oil lock piece 71 to the gap A1 even in a state where the oil lock piece 71 is in contact with the tip portion.

Meanwhile, a gap is formed between the oil lock piece 71 in this position and another tip portion of the holder 72 corresponding to an upper tip of the holder 72 in the figure.

When the piston rod 4 displaces in the elongation direction, therefore, working oil flows between the spaces on both sides of the oil lock piece 71 via the gap A1 so as not to interrupt the displacement of the piston rod 4 in the elongation direction.

When on the other hand the piston rod 4 is about to displace in a contracting direction from the position shown in the figure, the oil lock piece 71 contacts the tip portion corresponding to the upper tip of the holder 72 in the figure. Unlike the tip portion corresponding to the lower tip of the oil lock piece 71 in the figure, the tip portion corresponding to the upper tip of the holder 72 in the figure is not provided with a cut-out.

By contacting the oil lock piece 71, therefore, the tip portion corresponding to the upper tip of the holder 72 in the figure interrupts a working oil flow between the space above the oil lock piece 71 in the figure and the gap A1. As a result, the working oil in the space in the head member 31 below the oil lock piece 71 in the figure has no way to flow out, thereby locking the displacement of the piston rod 4 in the contraction direction from the position shown in FIG. 2A.

The position of the oil lock piece 71 shown in FIG. 2A corresponds to the most contracted position of the shock absorber. In other operation positions of the shock absorber where the oil lock piece 71 is located on the outside of the head member 31, the displacement of the piston rod 4 is not interrupted by the oil lock piece 71. The oil lock mechanism 7 becomes active only when the hydraulic shock absorber reaches the vicinity of the most contracted position.

By thus causing the oil lock piece 71 to invade the head member 31, the oil lock mechanism 7 locks further contraction of the shock absorber beyond the most contracted position while applying a cushion effect.

Referring again to FIG. 1, the oil surface O in the oil reservoir R is set in advance so as not to interrupt the above operation of the oil lock mechanism 7. Specifically, the oil surface O is set to ensure that the space in the head member 31 below the oil lock piece 71 in FIG. 1 is filled with working oil when the oil lock mechanism 7 starts to operate.

Referring again to FIGS. 2A and 2B, the head member 31 is attached to the inner tube 2 via a connecting mechanism 10 constituted by plural pairs of a stopper member 101 and a pin member 102. The connecting mechanism 10 ensures concentricity between the cylinder 3 and the inner tube 2 while allowing a minute displacement of the cylinder 3 in an axial direction with respect to the inner tube 2 according to a structure described below.

The stopper member 101 is a ring-shaped member screwed onto an outer circumference of the base of the head member 31. A male screw 31a is formed on the outer circumference of the base of the head member 31 and a female screw 101a is formed on an inner circumference of a base of the stopper member 101 for this purpose. The outer circumference of the stopper member 101 is in contact with the inner circumference of the inner tube 2.

A gap is formed between a tip of the stopper member 101 corresponding to an upper part thereof in FIG. 2B and an outer circumference of the inner tube 2. A plurality of holes 101b are formed through the tip of the stopper member 101 in a radial direction at equal angular intervals. A tip portion 102c of the pin member 102 penetrates the hole 101b. A flange portion 102a is formed at a base of the pin member 102. The flange portion 102a has a greater diameter than the tip portion 102c. The flange portion 102a is held in the gap between the tip of the stopper member 101 and the outer circumference of the inner tube 2.

A groove 102b facing the inner tube 2 is formed in the flange portion 102a in a circumferential direction. A snap ring 103 having a slightly greater inner diameter than the outer diameter of the inner tube 2 is fitted into the groove 102b of each pin member 102. Each pin member 102 is biased permanently by the snap ring 103 radially outward.

It should be noted that the shape of the stopper member 101 is not limited to a ring shape. As long as the female screw 101a can be formed on the inner circumference of the base of the stopper member 101 and the bases of the pin members 102 can be held as described above, the stopper member 101 may be formed in any shape.

The inner tube 2 has the same number of holes 2b as the pin members 102. The holes 2b are formed in a radial direction so as to allow the tip portions 102c of the pin members 102 to penetrate. Each hole 2b has a slightly greater diameter than the outer diameter of each tip portion 102c. This setting of the diameter of the holes 2b allows the pin members 102 to penetrate the hole 2b easily, thereby omitting the need for strict dimension control of the holes 2b and pin members 102.

The connecting mechanism 10 is preferably constituted by plural pairs of the pin member 102 and the hole 2b, but at least a single pair of the pin member 102 and the hole 2b can constitute the connecting mechanism 10.

A process of attaching the head member 31 to the inner tube 2 via the connecting mechanism 10 is performed as follows.

Specifically, the pin members 102 are inserted into the holes 101b of the stopper member 101. The snap ring 103 is fitted into the groove 102b of the flange portion 102a of each pin member 102, thereby biasing the pin members 102 radially outward.

As a result, the tip portion 102c of each pin member 102 projects from an outer circumference of the stopper member 101 in the radial direction. In this state, the stopper member 101 is fitted to the inner circumference of the inner tube 2. In this process the pin members 102 are temporarily pushed back into the holes 101b by contacting the inner circumference of the inner tube 2. The tip portion 102c of the pin member 102 is preferably formed to have a rounded top face so as to slide easily on the inner circumference of the inner tube 2.

The stopper member 101 is then moved in an axial direction and in a radial direction within the inner tube 2 until the tip portions 102c of the pin members 102 penetrate the holes 2b.

As the stopper member 101 reaches a correct position in the inner tube 2, the tip portions 102c of the pin members 102 penetrate the holes 2b automatically owing to the biasing force of the snap ring 103. Attachment of the stopper member 101 to the inner tube 2 is performed easily in this way.

In a state where the stopper member 101 is attached to the inner tube 2 correctly, the snap ring 103 is caused to invade the groove 102b of the flange portion 102a of each pin member 102 penetrating the hole 2b by the tip portion 102c. Accordingly, the snap ring 103 does not fall out of the groove 102b.

Next, the head member 31 is fixed to the stopper member 101, which has been attached to the inner tube 2. The inner circumference of the tip of the cylinder 3 is fitted onto the outer circumference of the base of the head member 31 in advance. The head member 31 is inserted into the interior of the inner tube 2 together with the cylinder 3, and the male screw 31a on the outer circumference of the base of the head member 31 is screwed into the female screw 101a on the inner circumference of the base of the stopper member 101. This is the only screwing operation required for fixing the cylinder 3.

After screwing the head member 31 to the stopper member 101 in this way, the bottom member 21 is screwed onto the outer circumference of the base of the inner tube 2 while gripping the flange 61 of the contraction damping valve 6 between the base of the cylinder 3 and the bottom member 21. The contraction damping valve 6 is thereby fixed to the bottom of the cylinder 3 without using a fixing member such as a bolt.

Slackness in the connecting mechanism 10 due to a difference between the diameter of the tip portions 102c of the pin members 102 and the diameter of the holes 2b is cancelled out when the bottom member 21 is screwed onto the outer circumference of the base of the inner tube 2. Specifically, when the bottom member 21 is screwed firmly onto the outer circumference of the base of the inner tube 2, a lower tip of the cylinder 3 is pushed by the bottom member 21 such that it moves in the axial direction, i.e., upward in FIG. 1, with respect to the inner tube 2.

In the connecting mechanism 10, the pin members 102 are pushed up by a rim of the holes 101b in the same direction as the displacement direction of the cylinder 3 until they come into contact with a rim of the holes 2b. As a result, the tip portion 102c of each pin member 102 is gripped by the rim of the hole 2b and the rim of the hole 101b in the axial direction. The slackness between the tip portions 102c and the holes 2b as well as the slackness between the tip portions 102c and the holes 101a are cancelled out in this way.

By screwing the bottom member 21 onto the outer circumference of the base of the inner tube 2 firmly, the inner tube 2 and the cylinder 3 are integrated.

By fixing the head member 31 to the stopper member 101, the groove 102b of the flange portion 102a of each pin member 102 is closed by the outer circumference of the head member 31, which also functions to prevents the snap ring 103 from falling out of the grooves 102b.

As described above, in this hydraulic shock absorber, since the head member 31 is simply inserted into the cylinder 3, the connecting structure between the head member 31 and the cylinder 3 is simplified. Varying a thickness of the tip of the cylinder 3 or forming a screw part on the tip of the cylinder 3 is not required in this hydraulic shock absorber.

Two screwing connections between the head member 31 and the stopper member 101 and between the inner tube 2 and the bottom member 21 cancel out the slackness in the connection between the inner tube 2 and the stopper member 101. As a result, the inner tube 2 and the cylinder 3 are integrated firmly through a simple assembling process.

The contents of Tokugan 2009-246705 with a filing date of Oct. 27, 2009 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in the embodiment described above, this invention is applied for a shock absorber in which the outer tube 1 is fixed to a vehicle body while the inner tube 2 is attached to a wheel axis. However, this invention can be applied to a shock absorber in which the inner tube is fixed to the vehicle body while the outer tube is attached to the wheel axis.

In the embodiment described above, the cylinder 3 and the bottom member 21 are arranged to grip the contraction damping valve 6. This invention can however be applied to a shock absorber in which the cylinder and the bottom member contact each other directly without gripping the contraction damping valve.

In the embodiment described above, a pair of the hydraulic shock absorbers form the front fork of the motor-cycle. However, the front fork may be constituted by one shock absorber and one telescopic body that comprises the outer tube 1 and the inner tube 2 but does not comprise a damper. This invention can be applied to the shock absorber for such a front fork.

The embodiments of this invention in which an exclusive property or privilege is claimed are defined as follows:

What is claimed is:

1. A fluid pressure shock absorber comprising:
a tube;
a cylinder disposed in the tube and having a tip and a base supported by the tube;
a head member supported on the tip of the cylinder;
a piston rod that penetrates the head member and that is free to slide;
a hole formed in the tube and having an opening facing the head member;
a ring-shaped stopper member screwed onto an outer circumference of the head member; and
a pin member passing through the stopper member radially, the pin member comprising a base that is supported by the head member radially outward and a tip portion that penetrates the hole.

2. The fluid pressure shock absorber as defined in claim 1, wherein the head member is fitted on an outer circumference of the tip of the cylinder.

3. The fluid pressure shock absorber as defined in claim 1, wherein the tip portion of the pin member penetrates the hole with a gap there-between.

4. The fluid pressure shock absorber as defined in claim 1, wherein the base of the pin member is supported by the head member to be movable along a center axis of the cylinder.

5. The fluid pressure shock absorber as defined in claim 4, wherein the base of the pin member comprises a flange portion held in a gap formed between the stopper member and the head member, and the tip portion passes through the stopper member with a gap there-between.

6. The fluid pressure shock absorber as defined in claim 1, further comprising a bottom member that is screwed onto the tube and supports the base of the cylinder.

7. The fluid pressure shock absorber as defined in claim 6, further comprising a fluid chamber formed in the cylinder, a fluid reservoir that is formed between the tube and the cylinder to store a working fluid, and a damping valve that is gripped between the bottom member and the cylinder to allow a fluid flow between the fluid chamber and the fluid reservoir.

8. The fluid pressure shock absorber as defined in claim 1, further comprising an outer tube that is fitted onto the tube to be free to slide, the piston rod being supported by the outer tube and penetrating the head member to be free to slide, and a piston that is connected to the piston rod and accommodated in the cylinder to be free to slide.

9. The fluid pressure shock absorber as defined in claim 8, further comprising a spring disposed between the head member and the outer tube.

10. The fluid pressure shock absorber as defined in claim 8, further comprising an oil lock piece that is fitted onto an outer circumference of the piston rod and invades the head member when the piston displaces to a certain position in the cylinder, the head member, the oil lock piece, and the piston rod forming an oil lock space that locks a further displacement of the piston when the oil lock piece invades the head member.

* * * * *